HENRY GETTY'S
IMPROVED ATTACHMENT TO GAS FITTERS GUAGES
No. 118,603.
Patented Aug. 29, 1871.
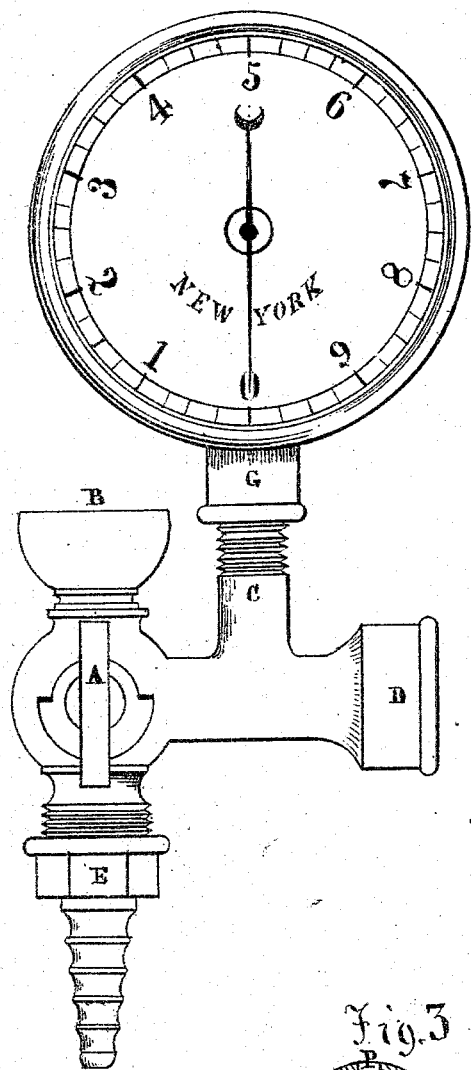
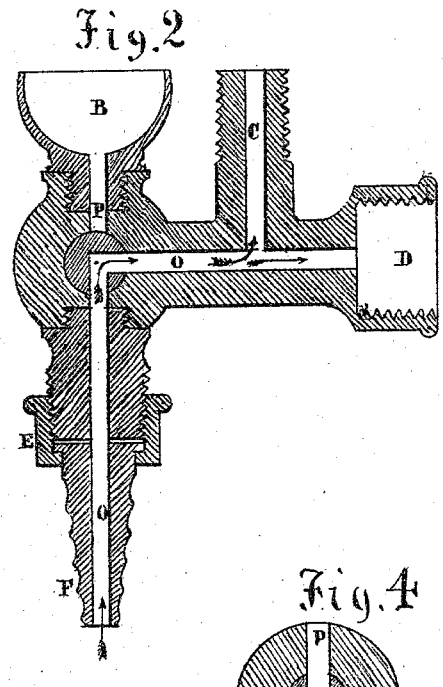
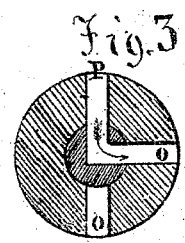
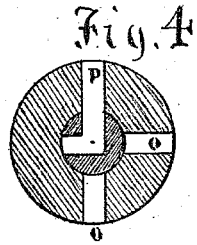
Henry Getty

UNITED STATES PATENT OFFICE.

HENRY GETTY, OF HOBOKEN, NEW JERSEY, ASSIGNOR TO LUCIEN KNAPP, OF NEW YORK CITY.

IMPROVEMENT IN ATTACHMENTS TO GAS-FITTERS' GAUGES.

Specification forming part of Letters Patent No. 118,603, dated August 29, 1871.

*To all whom it may concern:*

Be it known that I, HENRY GETTY, of the city of Hoboken, State of New Jersey, have invented, made, and applied to use a new and Improved Attachment for Gas-Fitters' Gauges; and I do declare the following to be a full, clear, and correct description of the same, reference being had to the accompanying drawing and to the letters of reference marked thereon making a part of this specification, in which—

Figure 1 is a perspective view of the attachment with the gauge connected with it; Fig. 2, a longitudinal section of the attachment, showing the various passages for the air and ether with the cock in the position shown in Fig. 1. Fig. 3 is a section of the cock separate from the attachment, showing its position when it is designed to pour ether into the cup and pipes. Fig. 4 is the same, showing the position of the cock when the ether-cup and air-pump are both shut off and the line of pipe to be tested and gauge are alone in communication.

Like letters of reference apply to like parts of the invention shown in the drawing.

The nature of my invention consists in making an attachment to gas-fitters' gauges and providing said attachment with an ether-cup and peculiar cock; also, a screwed neck for the reception of the gauge and a screw for the connection of the attachment to the line of pipe to be tested, and a coupling to connect with an air-pump.

To enable those skilled in the art to make and use my invention, I will now proceed to describe the construction and operation of the same.

The body of the attachment is cast of brass or other suitable material, with a neck, C, which is screwed for the reception of the gauge G, Fig. 1. It is also provided with a screw, D, Fig. 2, to fit the pipe to be tested, and another screw at the opposite end to fit the coupling E from the air-pump. It is also provided with an ether-cup, B, and a cock, A, said cock having a right-angle passage-way, as shown in Figs. 2, 3, and 4, the use of which will be explained hereafter.

Having thus fully described the different parts of my invention, I will now proceed to describe the operation of the same: The gauge G is screwed on the neck C of the attachment; the female screw D is then screwed on a suitable fitting in the pipes to be tested; the rubber hose from an air-pump is fastened to part F of the coupling E; said coupling is screwed to the attachment; the cock A is then turned to the position shown in Figs. 1 and 2, and the gauge and attachment are ready for action. The air from the pump passes through the cock into the pipes through the passage O O. When the gauge shows a suitable pressure the cock is turned into the position shown in Fig. 4. The air-pump and ether-cup are now shut off. If there should be a leak anywhere the gauge will show it. Should such be the case, the cock is turned to the position shown in Fig. 3. The air-pump is now shut off and ether is poured into the cup, which passes through the cock and passages P and O into the attachment. The cock is then turned to the position shown in Figs. 1 and 2, and the ether is forced into the pipes. These operations are repeated until the leak or leaks are found and stopped, when the operation is complete.

Having thus fully described my improvement and the construction and operation of the same, what I claim as my invention, and desire to secure by Letters Patent, is—

An attachment to gas-fitters' gauges, consisting of a body with a screwed neck, C, for the reception of a gauge, G, screw D to fasten to the pipes, ether-cup B, cock A, and coupling E, the whole combined and arranged as shown, for the purposes specified.

HENRY GETTY.

Witnesses:
L. KNAPP,
LUDOLF PARTON.